(No Model.)
5 Sheets—Sheet 1.
C. TOSTENSON.
Thrasher and Separator.
No. 233,818. Patented Oct. 26, 1880.
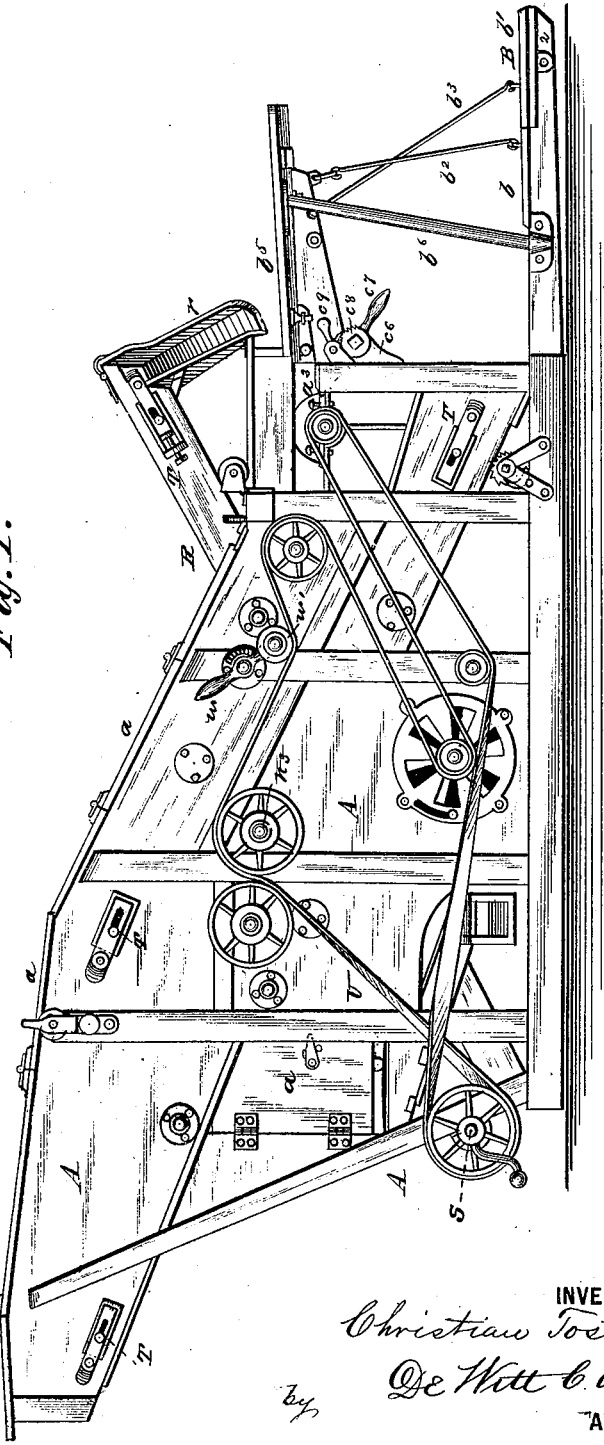
Fig. I.
WITNESSES
Fred G. Dieterich
J. H. Dieterich
INVENTOR
Christian Tostenson
by DeWitt C. Allen
ATTORNEY

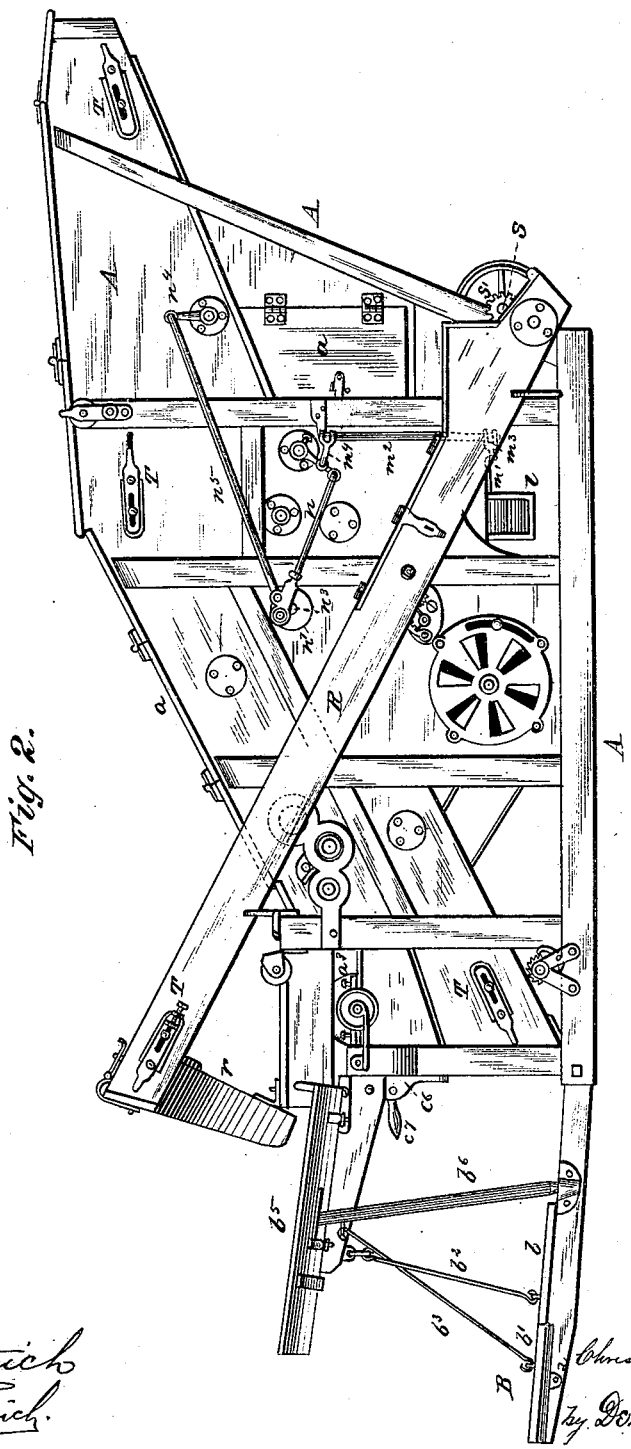

(No Model.)  5 Sheets—Sheet 3.
C. TOSTENSON.
Thrasher and Separator.
No. 233,818.  Patented Oct. 26, 1880.
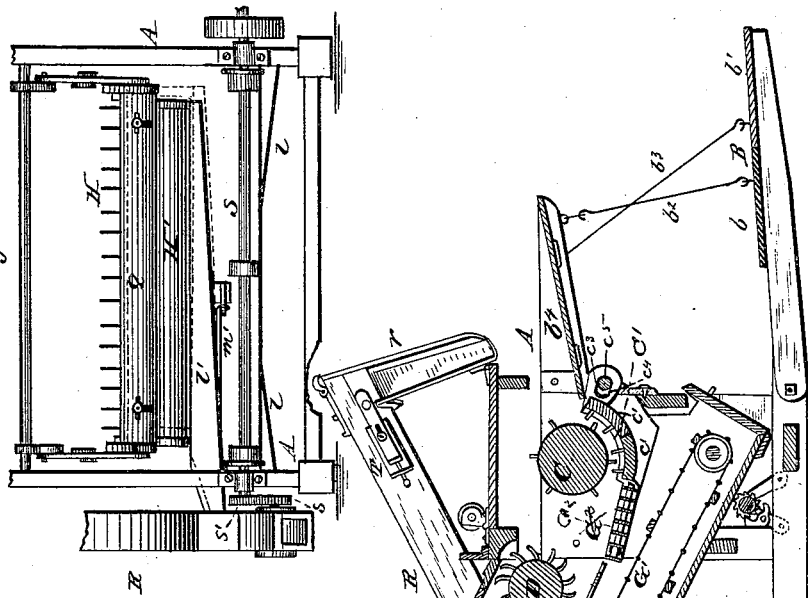
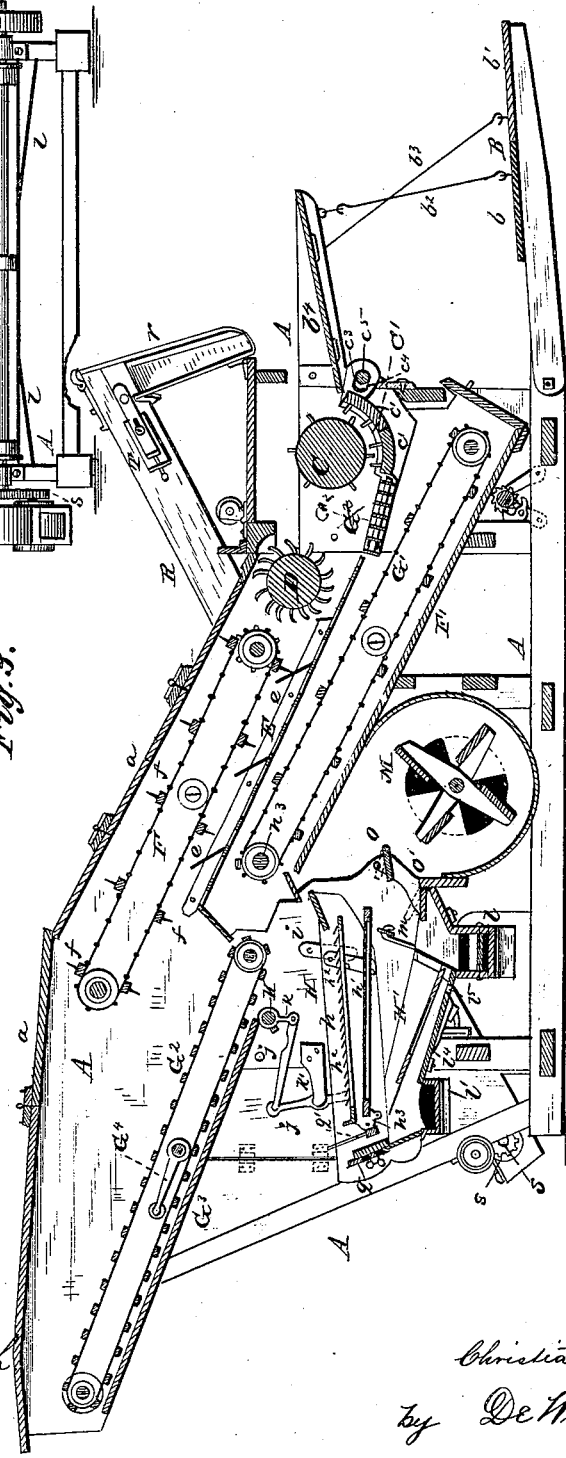
WITNESSES
Fred G. Dieterich
P. C. Dieterich
INVENTOR
Christian Tostenson
by DeWitt C. Allen
ATTORNEY (No Model.)  5 Sheets—Sheet 4.
C. TOSTENSON.
Thrasher and Separator.
No. 233,818. Patented Oct. 26, 1880.
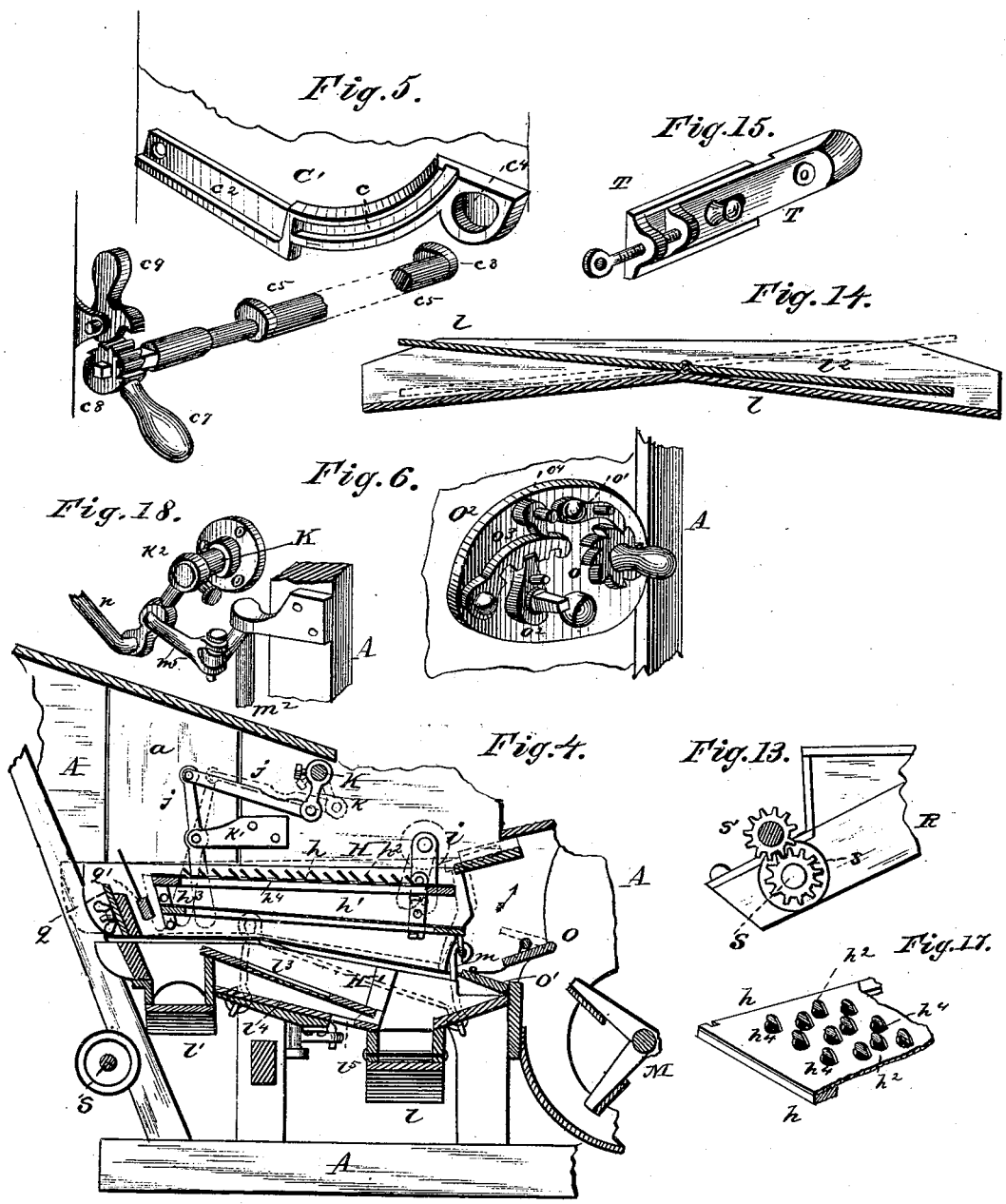
WITNESSES
Fred G. Dieterich
P. C. Dieterich
INVENTOR
Christian Tostenson
by DeWitt C. Allen
ATTORNEY

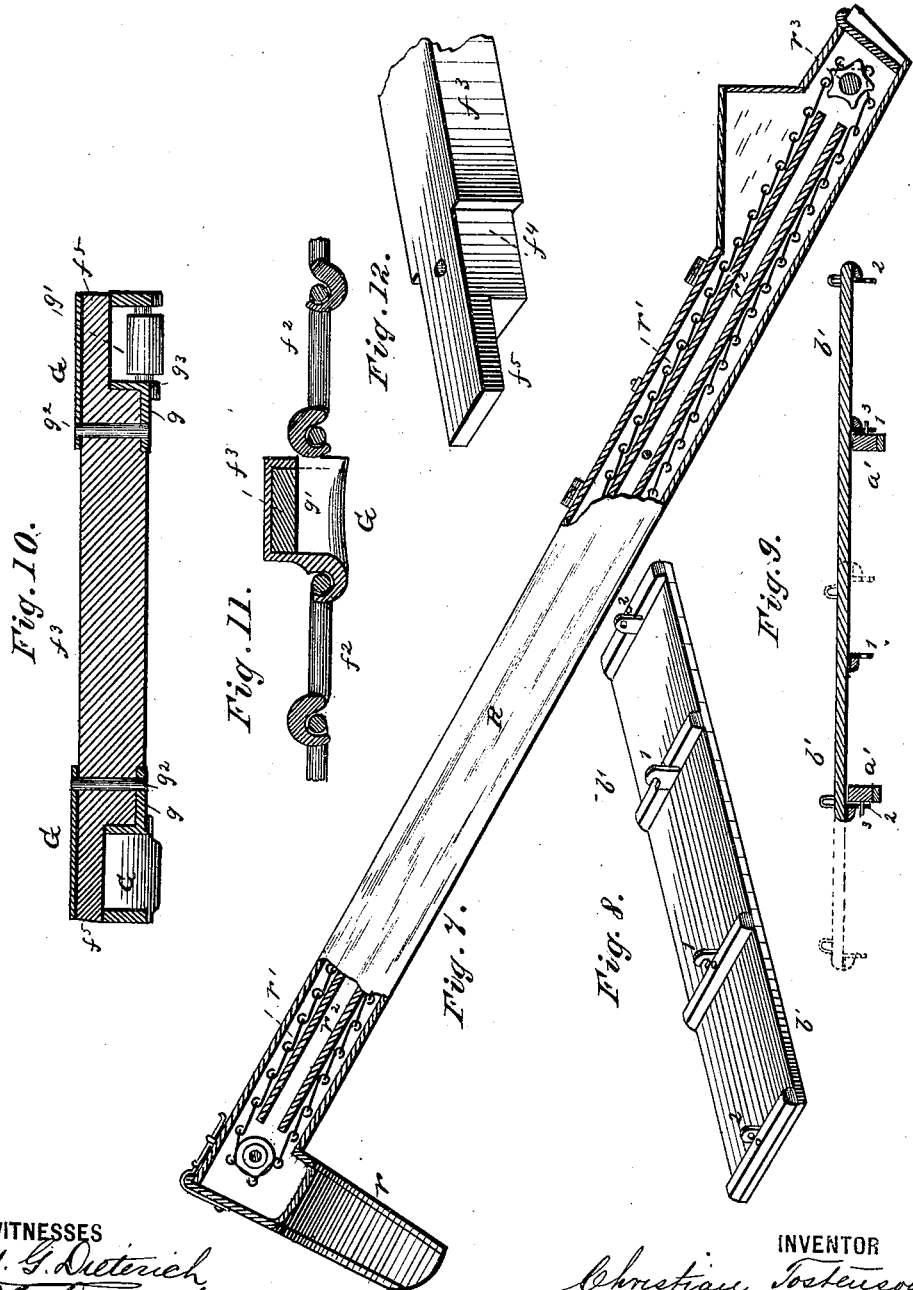

UNITED STATES PATENT OFFICE.

CHRISTIAN TOSTENSON, OF FOND DU LAC, WISCONSIN, ASSIGNOR TO McDONALD MANUFACTURING COMPANY, OF SAME PLACE.

THRASHER AND SEPARATOR.

SPECIFICATION forming part of Letters Patent No. 233,818, dated October 26, 1880.

Application filed March 29, 1880. (No model.)

*To all whom it may concern:*

Be it known that I, CHRISTIAN TOSTENSON, a citizen of the United States, residing at Fond du Lac, in the county of Fond du Lac and State of Wisconsin, have invented certain new and useful Improvements in Combined Thrashing-Machine and Grain-Separator; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figures 1 and 2 represent opposite side views of my improved machine; Fig. 3, a longitudinal vertical section of the same; Fig. 4, an enlarged sectional view of the separating-shoe; Fig. 5, detached view of one of the concave hangers and adjusting mechanism; Fig. 6, enlarged view of the mechanism for adjusting and securing the wind-boards in position; Fig. 7, side view of the return-elevator, with a portion broken away to show the interior construction; Fig. 8, bottom-plan view of one of the sections composing the feeder's platform; Fig. 9, longitudinal section of the same when secured in position; Figs. 10, 11, and 12, detached partial views of the straw-carrier; Fig. 13, detached view, showing the gearing for operating the mechanism that moves the elevating-chain; Fig. 14, longitudinal section of one of the discharge-spouts of the separating-shoe; Fig. 15, enlarged view of one of the adjustable boxes for regulating the tension of the chains of the carriers and elevator; Fig. 16, rear-end view of the separating-shoe; Fig. 17, detailed perspective view of the sieve *h;* Fig. 18, perspective view of the pitman and crank connections.

My invention relates to certain new and useful improvements in the class of combined thrashing-machines and grain-separators, and more particularly to improvements on the patents to J. Smith, dated November 25, 1873, No. 144,874, and D. O. B. Ladd, dated January 14, 1873, No. 134,901, having for its object the production of a machine combining simplicity in the construction and operation of the several parts thereof, while overcoming defects incident to the construction of machines under the above-cited patents, and also to this class of machines in general; and to this end the invention consists in a novel construction of feeder's platform, whereby it is adapted to be also used by the band-cutter on either side of the machine.

It also consists in a novel construction of straw-carrier, whereby a positive motion is at all times insured, thus obviating the defects of slipping or stretching incident in leather or rubber belts generally used for this purpose.

It also consists in novel constructions and arrangement of the several parts constituting the separating-shoe and means for operating it, including the means for applying the blast thereto, whereby greater efficiency is secured in separating the grain, as well as the tailings and unthrashed heads, from the chaff and straw.

It further consists in a novel construction of elevating mechanism for returning the tailings and unthrashed heads of grain to the head of the machine, whereby the choking or clogging of the elevator and the slipping or stretching incident in belts and cups generally used in this class of machines is entirely obviated.

It finally consists in novel combination and arrangement of parts, including minor details of construction, all as will be hereinafter fully described, and specifically pointed out in the claims.

To enable others skilled in the art to which my invention appertains to make and use the same, I will now proceed to describe its construction and operation.

Referring to the accompanying drawings, like letters of reference indicate like parts in the several figures.

In the drawings, A represents the general frame-work and inclosing-casing of the machine, having hinged doors *a* at different points, whereby access may be had to the interior or working parts of the machine.

B represents the feeder's platform, composed of the longitudinal sections *b b'*, supported on the sills *a'*, extending out in front of the machine. The section *b'* of said platform is made longer than the section *b*, so as to extend beyond one end thereof to form a band-cutter's platform, and said section is adapted to be adjusted on the sills $a'$, so as to be extended beyond either end of the section $b$, whereby the band-cutter can work on either side of the machine, as clearly shown in plain and dotted lines, Fig. 9. The section $b'$ is provided on its under side with hooks 1 1, and perforated plates or eyes 2 2, adapted to engage with the pins 3 3 in the sills $a'$, for securing said section in position when extended beyond either end of the section $b$, and both of said sections are connected to the extended sills $a^2$, to which the band-cutter's and feeder's tables are connected by the hooked rods $b^2$ and $b^3$, the hooked rod $b^3$ being changed to either side of the machine for supporting the extended end of the section $b'$.

$b^4$ represents the feed-table, and $b^5$ $b^5$ the band-cutter's tables, arranged upon opposite sides of the feed-table, and connected to the sills $a^2$ and supported by the poles $b^6$ $b^6$ in the usual manner.

C represents the thrashing-cylinder, journaled in boxes bolted to heavy wide bearings on the top of the iron sides at this part of the machine.

The concave hangers $C'$ are formed, as shown in Fig. 5, with grooves $c$ on the inner sides thereof, in which are inserted the ends of the removable sections $c'$ $c'$, composing the concave, and the hangers in rear of said grooves are provided with ledges $c^2$ $c^2$, upon which is supported and secured the grate $C^2$. The hangers are fulcrumed back of the grate, and their front ends are suspended on eccentrics or cams $c^3$ $c^3$, working in correspondingly-shaped recesses $c^4$ $c^4$, formed in the front ends of the hangers. These eccentrics or cams $c^3$ $c^3$ are fixed on a shaft, $c^5$, journaled in bearings $c^6$ $c^6$, and one end of said shaft is provided with a handle, $c^7$, and a toothed wheel, $c^8$, with which a pawl, $c^9$, engages, whereby said shaft can be turned and secured in any desired position, so as to simultaneously raise or lower the hangers $C'$, and thereby adjust the concave and grate relatively to the cylinder C.

The fulcrum of the hangers $C'$, at their rear ends, is arranged below their suspension-point at the front ends, and by this arrangement, as the hangers are adjusted at their front ends to lower or raise the concave and grate, the throat is equally enlarged or diminished entirely around the lower half of the cylinder. The result is light, dry, brittle straw is subjected more thoroughly to the thrashing process by raising the concave and grate, while more throat or room all around the cylinder is given for long, wet, tough straw by lowering the concave and grate, and with less liability of choking or winding than in the class of thrashing-machines where the concave and grate hangers are suspended on a horizontal line with or below the rear fulcrum of the hangers.

D represents a toothed cylinder arranged in rear of the thrashing-cylinder, for assisting in the thrashing and separating process, also acting as a picker or beater in relieving the cylinder C of the straw, which it hastens backward, and thus insuring the cleaning of the throat and preventing choking or clogging, or the winding of the straw around the thrashing-cylinder.

E represents a stationary inclined sieve or open iron floor constructed of band-iron, with large openings and broken joints, and it is provided with three rows of iron fingers, $e$, inclining backward at an angle of forty-five degrees, and arranged equidistant from the ends and from each other. Over this sieve or floor and fingers the straw, after leaving the thrashing-cylinder, is carried, whereby the separation of the grain is rapidly and thoroughly accomplished.

F represents the inclined endless revolving rake or straw-carrier, the teeth $f$ of which interlace with those of the cylinder D, effectually freeing the latter from straw or danger of straw winding thereon, and also carrying the straw rapidly back over the sieve or floor E toward the rear of the machine, the teeth of the rake or carrier passing between or through the rows of fingers of the sieve or floor, thus continuing the stripping and separating process, while the fingers of the floor, by their inclination, are constantly raising the straw from the surface thereof and preventing its matting or packing, while obviating the cutting and breaking up of the straw incident to the short teeth heretofore used, and more fully and thoroughly shaking it up, thus affording every facility for the thorough separation of the grain from the straw. The grain dropping through the grate $C^2$ and sieve or floor E falls down onto the grain-floor $E'$, from which it is carried by the endless carrier $G'$ to the head of the separating-shoe. The endless chains $f'$ $f'$ of the rake or carrier F are composed of removable links $f^2$ and iron boxes or sockets G, for the reception of the ends of the rake-heads $f^3$. These boxes or sockets are provided with an inward extension, $g$, for the reception of nearly the full-sized portion $f^4$ of the rake-heads, while the main portion $g'$ is left open on one side, to permit of their passing over the sprocket-wheels for driving the rake or carrier, said portions $g'$ also receiving the end or cut-away portion $f^5$ of the rake-heads. These boxes or sockets are constructed with a partition or division, $g^3$, which gives additional strength thereto, and the rake-heads are securely riveted in said boxes or sockets by bolts $g^2$, the construction of said parts being more clearly shown in Figs. 10, 11, and 12. By the use of these boxes or sockets the rake-heads are strengthened at their ends and all danger of splitting obviated. This construction of endless rake or carrier, while being very strong and durable, obviates the defects of slipping and stretching incident in leather or rubber belts generally used for this purpose, and especially in wet grain, and said rake or carrier being driven by sprocket-wheels, the motion is positive and sure under all circumstances.

The straw, being carried by the rake or carrier F to the rear extremity of the sieve or open floor E, is thrown down onto a second endless raddle or carrier, $G^2$, and by this carried to the rear and discharged out of the machine, while the grain falls through it onto the inclined floor $G^3$ and passes down onto the screens in the separating-shoe. The carrier $G^2$ has arranged inside thereof an agitator, $G^4$, which is vibrated through the medium of a crank, $n^4$, on the end of the shaft of the agitator, connected by a rod, $n^5$, with the pitman $n$, whereby the carrier is shaken and the grain more effectually separated from the straw.

The separating-shoe is divided into two sections, H H′, the upper section, H, having two screens, $h\ h'$, the lower screen, $h'$, being the ordinary wire screen, but of coarser mesh, while the upper screen is composed of galvanized iron, having openings $h^4$ cut through it of oblong shape, with the lips $h^2$ curved upward and toward the tail of the screen, as shown in Figs. 4 and 17. The screens $h\ h'$ are held in position at their corners by the iron holders or receivers $h^3$, and said screens can be readily raised or lowered at either or both ends, and singly or together. This section H of the separating-shoe is suspended near the front end by the pivoted links $i\ i$, while its rear end is suspended and operated from the double levers $j\ j$, fulcrumed at or near their centers in the bearings $j'\ j'$, said levers being connected at their upper ends to the cranks $k\ k$, adjustably mounted on the vibrating shaft K by the rods $k'\ k'$, and through the medium of said vibrating double levers the section H is adapted to receive a longitudinal vibrating movement or end shake and a rising-and-falling or vertical movement at the head end thereof, while the movement at the tail end is nearly or about level or horizontal, as clearly shown by dotted and plain lines, Fig. 4.

The lower section, H′, of the shoe is provided with two transverse discharge-spouts, $l\ l'$, the spout $l$ receiving the grain passing through the screens $h\ h'$, while the spout $l'$ receives the tailings and unthrashed heads or bolls passing over the tail of the screens. The spout $l$ inclines in opposite directions from the center, and is provided with a longitudinal pivoted chute, $l^2$, (see Fig. 14,) by which the grain is adapted to be discharged at either end of the spout, and out of the machine on either side, while the spout $l'$ discharges into the trough of the return-elevator.

Between the spouts $l\ l'$ is arranged an inclined grass or other small seed-screen, $l^3$, onto and over which passes the grain from the upper screens of the section H to the trough $l$, while the grass and other small seeds fall through said screen onto the board $l^4$, and is discharged out of the machine through opening $l^5$. This section H′ of the shoe is suspended from the inner sides of the machine by the hangers $m\ m$, formed in one piece, and in the shape shown in Fig. 4, and said section receives a transverse vibrating or side-shake movement at right angles to the upper section, H, of the shoe, through the medium of the connecting-rod $m'$ and the vertical double vibrating crank-rod $m^2$, the lower crank, $m^3$, being connected to said rod $m'$ at one end, while the other end of the rod is connected to the under side or bottom of said section. The upper crank, $m^4$, is connected by a rod, $m^5$, to the adjustable crank $k^2$, mounted on the outer end of the shaft K. This crank $k^2$ vibrates both the shaft K and crank-rod $m^2$, through the medium of which both sections of the separating-shoe are operated, as above described, and said crank $k^2$ is operated through the medium of pitman $n$ and eccentric or crank wheel $n'$, mounted on the outer end of the revolving shaft $n^3$.

The combination of the end and side shakes or motions given to the shoe makes it better adapted for its work of separating the grain from the chaff and straw, as in this combination of the end and side shakes or motions, the shoe being in two sections, the work is divided, and the wear and tear is not therefore so great, giving a much steadier action to the machine, thus rendering it much more durable, for while the upper section, H, works endwise the lower section works sidewise, and thus, the work either section would do alone being divided, a much better result is obtained, as, the motion of one section of the shoe being at right angles to the other section thereof the vibrations of the one section tend to break up or counteract the tremors of the frame of the machine set up by the regular and repeated shocks imparted by the vibrations or motions of the other, it being a well-known fact that regularly-repeated shocks accumulate in the structure, and may finally destroy it, just as musical sounds or the regular tread of men in rank act in their sum or result to break down a bridge or other structure in passing over it. The regularly-repeated shocks imparted by the vibrations or motions of one section on the frame-work of the machine, which tend to loosen and affect the several operating parts thereof, are entirely obviated, and thus all bracing of the machine generally resorted to for overcoming these defects is not necessary.

In addition to the end shake given the upper section, the rising-and-falling movement at the head thereof (while the motion at the rear end is about level or horizontal) greatly facilitates the cleaning of the grain by spreading it evenly over the screens and bringing it where the blast from the fan M can act more effectually upon it in separating the chaff from the grain, with little or no danger of blowing the grain over the tail end of the screens or shoe. The movements of said section H are such that one motion carries the grain and chaff forward over the upper screen, while the next motion carries the grain backward under the lips $h^2$, through the upper screen, from which it passes down through the second screen, $h'$, onto the screen in the lower section, H′, where the grass and other small seeds are separated therefrom, the grain passing over said screen into the discharge-spout $l$, while the tailings and unthrashed heads or bolls pass over the tail of the screens $h\ h'$ into the discharge-spout $l'$, and thence to the return-elevator. The rear end of the shoe is provided with an adjustable end board, $q$, and a pivoted shaft, $q'$, carrying a series of projecting wires or fingers, for preventing loose straw from falling down into the tailings-spout $l'$.

Two adjustable wind-boards, O O′, are arranged in the mouth of the fan-case—one for directing the blast on the head of the screens, while the other one directs the blast to the rear or tail end of the screens, thus equally dividing the blast on all parts of the screen.

$O^2$ represents a double ratchet-plate, in which one end of the wind-boards are journaled, one being provided with a ratchet-wheel, $o$, with which the pawl $o'$ engages for securing it in any desired position, while the other is provided with a cog or tooth, $o^2$, engaging with a toothed plate, $o^3$, held in locked position with said cog or tooth, when the wind-board is properly adjusted by a cam, $o^4$, all as clearly shown in Fig. 6. The sides of the fan-case are provided with the usual registers for regulating the blast.

R represents the return or tailings elevator, having at its upper end a hinged and adjustable discharge-spout, $r$, whereby the operator is enabled to swing said spout out of the way without stopping the machine to adjust the cover of the thrashing-cylinder. The tailings, &c., discharged into the lower end of the elevator from spout $l'$ are elevated through the medium of an endless linked chain, $r'$, running over a pulley at the top of the elevator, and a sprocket or cogged wheel, $r^3$, at the bottom end thereof, and also around a longitudinal board, $r^2$, centrally arranged in the elevator, the spaces between the links of the chain, in connection with the upper surface of the board $r^2$, forming cups or buckets by which the tailings, &c., are carried up the elevator and discharged in the spout $r$, which delivers them into the head of the machine to be rethrashed.

Motion is communicated to the endless linked chain by the sprocket or cogged wheel $r^3$, having a gear-wheel, $s$, mounted on the shaft thereof outside of the elevator, which meshes with a gear-wheel, $s'$, mounted on the driving-shaft S.

By the use of the endless linked chain $r'$ and the central board, $r^2$, of the elevator, the defects of clogging or choking of the elevator and the stretching and slipping incident on the use of cups or buckets arranged on leather belts is entirely obviated, while the sprocket or cogged wheel $r^3$ insures a steady and positive motion to the endless linked chain.

The shafts of the endless rakes, carriers, and elevating mechanism are journaled in adjustable sliding boxes T; consequently everything runs loose and without danger of slipping.

The several operating-shafts of the machine are provided with band-pulleys, over and around which runs the endless and crossed belt U, for communicating motion thereto from the driving-shaft S, all as clearly shown in Fig. 1. In order to keep said belt always taut and prevent slipping, I employ the usual belt-tightener, consisting of a pivoted lever, $w$, provided with a pulley, $w'$, said lever being held in any desired position by a pawl and ratchet-wheel or other suitable means.

I do not wish to be limited to the means herein described for giving the different motions to the sections of the separating-shoe before referred to, as any means suitable for producing said motions may be substituted therefor.

Further explanation of the operation of my improved machine is deemed unnecessary, it being obvious from the foregoing description.

Having thus fully described my invention, what I claim as new, and desire to secure by Letters Patent, is—

1. A feeder's platform for thrashing-machines, composed of the longitudinal section $b$ and the longitudinal adjustable section $b'$, extending beyond one end of the section $b$, forming a band-cutter's platform at either side of the machine, substantially as herein shown and described.

2. In a feeder's platform for thrashing-machines, the combination of the section $b$, sills $a'\ a'$, provided with the pins 3 3, and the section $b'$, extending beyond one end of the section $b$, and having the hooks 1 1 and perforated plates or eyes 2 2 on its under side, substantially as and for the purpose herein shown and described.

3. In a combined thrasher and separator, the inclined sieve or open iron floor E, having the rows of inclined fingers $e$, in combination with the cylinders C D, concave and grate, endless rake or carrier F $f$, endless carriers G′ $G^2$, inclined grain-floors F′ $G^3$, and separating-shoe, the several parts arranged relatively to each other substantially in the manner herein shown and described.

4. In an endless rake or straw-carrier for thrashing-machines, the combination, with the rake-heads, of the links $f^2$ and metallic boxes or sockets having the open portion $g'$ and extension $g$, for the reception of the ends of the rake-heads, substantially as herein shown and described.

5. In an endless rake or straw-carrier, the combination of the metallic boxes or sockets G, having the open portion $g'$, extension $g$, and partition $g^3$, and the rake-heads having their ends formed to fit in said boxes or sockets, substantially in the manner herein shown and described.

6. In a combined thrasher and separator, the combination, with thrashing and straw-conveying mechanism, of the sections H H', composing the separating-shoe, having vibrating or shaking movements at right angles to each other, substantially as and for the purpose herein shown and described.

7. In a combined thrasher and separator, the combination of the divided and suspended sections H H', forming the separating-shoe, and operating mechanism, substantially as described, whereby the section H is adapted to receive a longitudinal vibrating movement or end shake and a rising-and-falling movement at the head or front end thereof, and the section H' a transverse vibrating or side-shake movement, substantially as and for the purpose herein shown and described.

8. In a combined thrasher and separator, the combination of the section H, having the screens $h\ h'$, the section H', having the transverse discharge-spouts $l\ l'$ and intermediate inclined screen, $l^3$, and operating mechanism, substantially as described, whereby the section H is adapted to receive a longitudinal vibrating or end-shake movement and a rising-and-falling movement at the head or front end thereof, and the section H' a transverse vibrating or side-shake movement, substantially as and for the purpose herein shown and described.

9. In a combined thrasher and separator, the combination of the longitudinally-vibrating section H of the separating-shoe, having a rising-and-falling movement at the head or front end thereof, the screen $h$, mounted therein, having the oblong openings $h^4$, with lips $h^2$, curved upward and toward the tail or rear end of the screen, and the fan and adjustable wind-boards for regulating or equalizing the blast through the screen, substantially as and for the purpose herein shown and described.

10. The combination, with the sections composing the separating-shoe, of the operating mechanism consisting of the double levers $j\ j$, rods $k'\ k'$, vibrating shaft K, having the cranks $k\ k\ k^2$, connecting-rod $m'$, vertical double crank-rod $m^2$, rod $m^5$, the pitman $n$, and revolving eccentric or crank wheel $n'$, all arranged relatively to each other substantially in the manner herein shown and described.

11. In a combined thrasher and separator, the return or tailings elevator having a longitudinal central board, $r^2$, and an endless linked chain passing around said board, whereby the spaces between the links of the chain and the upper surface of said board form cups or buckets for conveying the tailings, &c., to the upper end of the elevator, substantially as and for the purpose herein shown and described.

In testimony whereof I affix my signature in presence of two witnesses.

CHRISTIAN TOSTENSON.

Witnesses:
A. J. ALLEY,
PAUL SWENSON.